(12) United States Patent
Nakamae et al.

(10) Patent No.: US 7,520,561 B2
(45) Date of Patent: Apr. 21, 2009

(54) FRONT STRUCTURE OF AUTOMOTIVE VEHICLE

(75) Inventors: Takayuki Nakamae, Hiroshima (JP);
Susumu Kuroda, Hiroshima (JP);
Yasunori Kageyama, Hiroshima (JP);
Toshio Sakamoto, Hiroshima (JP);
Hiroki Fujii, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 148 days.

(21) Appl. No.: 11/709,131

(22) Filed: Feb. 22, 2007

(65) Prior Publication Data
US 2007/0216198 A1 Sep. 20, 2007

(30) Foreign Application Priority Data
Mar. 20, 2006 (JP) .............................. 2006-076014

(51) Int. Cl.
*B60J 7/00* (2006.01)
(52) U.S. Cl. .................. 296/193.09; 296/193.1; 180/68.4; 293/117
(58) Field of Classification Search ............ 296/193.09, 296/203.02, 193.1; 180/68.4; 293/117, 154, 293/155
See application file for complete search history.

(56) References Cited

U.S. PATENT DOCUMENTS
2002/0129981 A1* 9/2002 Satou ...................... 180/68.6

FOREIGN PATENT DOCUMENTS
EP 1 440 871 7/2004
JP 2006-001358 1/2006
JP 2006 001358 1/2006

OTHER PUBLICATIONS
Extended European Search Report Application No. EP 07 00 4057 dated May 10, 2007.

* cited by examiner

*Primary Examiner*—Joseph D Pape
(74) *Attorney, Agent, or Firm*—Studebaker & Brackett PC; Donald R. Studebaker

(57) ABSTRACT

A front structure of an automotive vehicle, comprising a shroud having a shroud upper, shroud lower, and a pair of shroud sides, a bumper face, and a plate member, a front end of which extends to a position near a back face of the bumper face and a rear end of which is attached to the shroud lower, wherein protruding portions are provided at both-side ends of the plate member so as to protrude outward respectively in a vehicle width direction from both-side ends of the shroud lower, and projecting portions are provided at the protruding portions so as to project rearward respectively along side end portions of the shroud lower. Accordingly, the prevention of pedestrian dragging against the vehicle frontal oblique crush can be improved.

5 Claims, 14 Drawing Sheets

FRONT STRUCTURE OF AUTOMOTIVE VEHICLE

BACKGROUND OF THE INVENTION

The present invention relates to a front structure of an automotive vehicle, and in particular, relates to a front structure in which prevention of dragging of a pedestrian can be properly improved with a plate member that is provided between a bumper face and a shroud lower when the vehicle hits the pedestrian obliquely from the front.

Generally, an automotive vehicle has a shroud that is provided for attaching a radiator or condenser. The shroud comprises a shroud upper, shroud lower, and a pair of shroud sides, which is formed in a rectangular shape, and the shroud is supported at a vehicle front portion behind a front bumper. A plate member that is made from synthetic resin is provided in front of the shroud lower, which may prevent dragging of a pedestrian by tripping legs of the pedestrian at the vehicle hitting the pedestrian.

Japanese Patent Laid-Open Publication No. 2006-1358, for example, discloses a front structure of a vehicle in which the plate member is provided in front of the shroud lower so as to extend substantially a whole width of the shroud lower, so the pedestrian's legs may be tripped up.

According to the front structure of a vehicle disclosed in the above-described patent publication, since the plate member that has substantially the same length as that of the shroud lower in a vehicle width direction is provided, the prevention of the pedestrian dragging against a vehicle frontal crash may be properly achieved. However, since there is another case where the vehicle hits the pedestrian obliquely from the front or the like, not straightly from the front, there is a demand that the prevention of the pedestrian dragging could be properly achieved for any types of vehicle hitting the pedestrian in order to further improve a safety of the pedestrian further.

Herein, it may be considered that the length of the plate member is further extended so as to enlarge the prevention range of the pedestrian dragging. In this case, however, since both-side ends of the plate member extend outward beyond both-side ends of the shroud lower, a support rigidity of the extended end portions of the plate member could not be strong enough to properly receive the crash impact (load) acting from the front. As a result, there is a concern that these extended end portions would deform toward the back of the shroud sides, so that the prevention of the pedestrian dragging could not be achieved against the vehicle crash case where the vehicle hits the pedestrian obliquely from the front.

SUMMARY OF THE INVENTION

The present invention has been devised in view of the above-described problem, and an object of the present invention is to provide a front structure of an automotive vehicle that can improve the prevention of pedestrian dragging against the vehicle frontal oblique crash.

According to the present invention, there is provided a front structure of an automotive vehicle, comprising a shroud lower provided at a front portion in an engine room, the shroud lower supporting a heat exchanger, a bumper face provided at a front end portion of a vehicle body, and a plate member, a front end of which extends to a position near a back face of the bumper face and a rear end of which is attached to the shroud lower, wherein protruding portions are provided at both-side ends of the plate member so as to protrude outward respectively in a vehicle width direction from both-side ends of the shroud lower, and projecting portions are provided at the protruding portions so as to project rearward respectively along side end portions of the shroud lower.

When the vehicle hits the pedestrian obliquely from the front (frontal oblique crash), the crash impact may act on the protruding portions of the plate member. Herein, the protruding portions of the plate member are supported by the side-end portions of the shroud lower, so the crash impact acting on the protruding portions of the plate member can be properly received by the side-end portions of the shroud lower. Namely, since the protruding portions of the plate member can be supported by the side-end portions of the shroud lower having the sufficient rigidity, the prevention of the pedestrian dragging against the vehicle frontal oblique crush can be improved, so the safety of the pedestrian can be enhanced.

According to an embodiment of the present invention, the front structure further compresses a shroud upper to support an upper portion of the heat exchanger, and a pair of shroud sides to interconnect both-side end portions of the shroud upper and both-side end portions of the shroud lower, wherein at the both-side ends of the plate member including the protruding portions are provided seal wall portions to seal at least part of a gap between the shroud side and the bumper face, and a plurality of ribs are provided between the seal wall portions and the projecting portions so as to connect the both portions respectively. Accordingly, since at the both-side ends of the plate member including the protruding portions are provided the seal wall portions to seal at least part of the gap between the shroud side and the bumper face, it can be prevented properly that heated air from the engine or heat exchanger flows back to the front of the heat exchanger via the gap between the shroud side and the bumper face. Further, since the plurality of ribs are provided between the seal wall portions and the projecting portions so as to connect the both portions respectively, a rigidity of the projection portions of the plate member can be properly increased. And, since the above-described prevention of the heated-air flowing back and rigidity increase can be attained without any improper increase of the number of parts, manufacturing costs can be properly reduced.

According to another embodiment of the present invention, there is provided a connecting portion to connect the plate member to a front face of the shroud side, and the connecting portion is formed integrally with an inside end portion of the seal wall portion. Accordingly, the support force of the shroud side for the plate member can be properly increased by using a structure of the seal wall portions.

According to another embodiment of the present invention, a plurality of vertical ribs to extend substantially in a longitudinal direction of the vehicle are provided at plural portions of a lower face of the plate member in the vehicle width direction, and plural vertical ribs that are provided at a lower face of the protruding portion are formed so as to extend obliquely with respect to the longitudinal direction of the vehicle in such a manner that rear portions thereof are directed inwardly in the vehicle width direction. Thereby, since the vertical ribs receive the load of the crash impact acting on the protruding portions of the plate member at the vehicle frontal oblique crash, the rigidity of the protruding portions of the plate member can be increased. Accordingly, it can be prevented that the protruding portions of the plate member deform toward the back of the shroud sides.

According to another embodiment of the present invention, a plurality of lateral ribs to extend substantially in the vehicle width direction are provided at the lower face of the plate member, and the plural lateral ribs are formed so as to be substantially perpendicular to the vertical ribs provided at the lower face of the protruding portion. Thereby, the lateral ribs receive effectively the load of the crash impact acting on the vertical ribs of the protruding portions of the plate member at the vehicle frontal oblique crash, the deformation of the protruding portions of the plate member can be prevented.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Hereinafter, a first embodiment of the present invention will be described referring to FIGS. 1 to 12.

Figure 1:
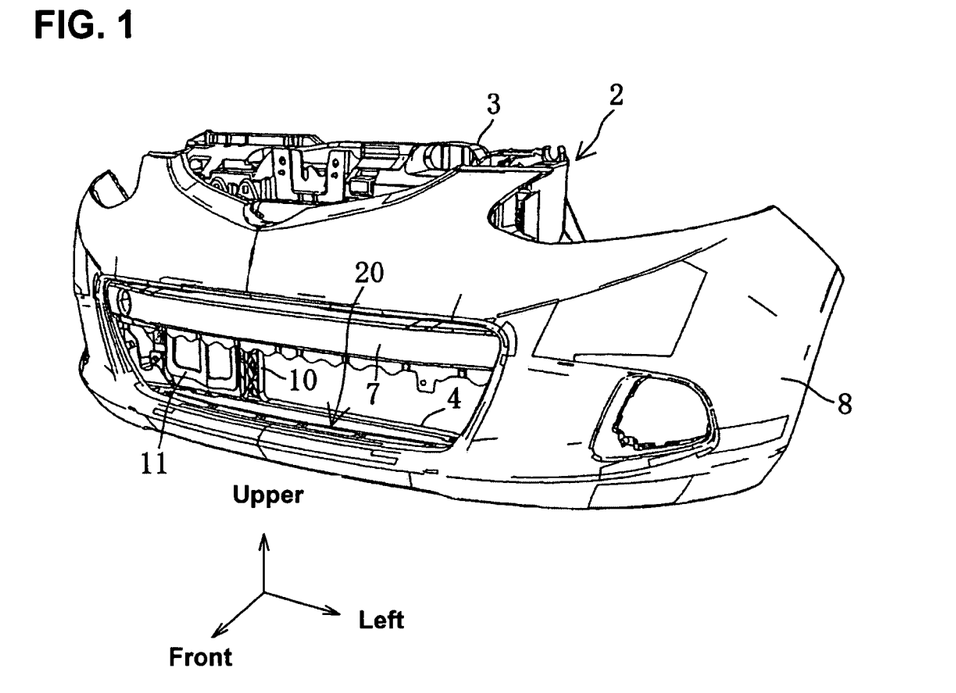
FIG. 1 is a perspective view of a front portion of an automotive vehicle according to a first embodiment of the present invention.
Figure 2:
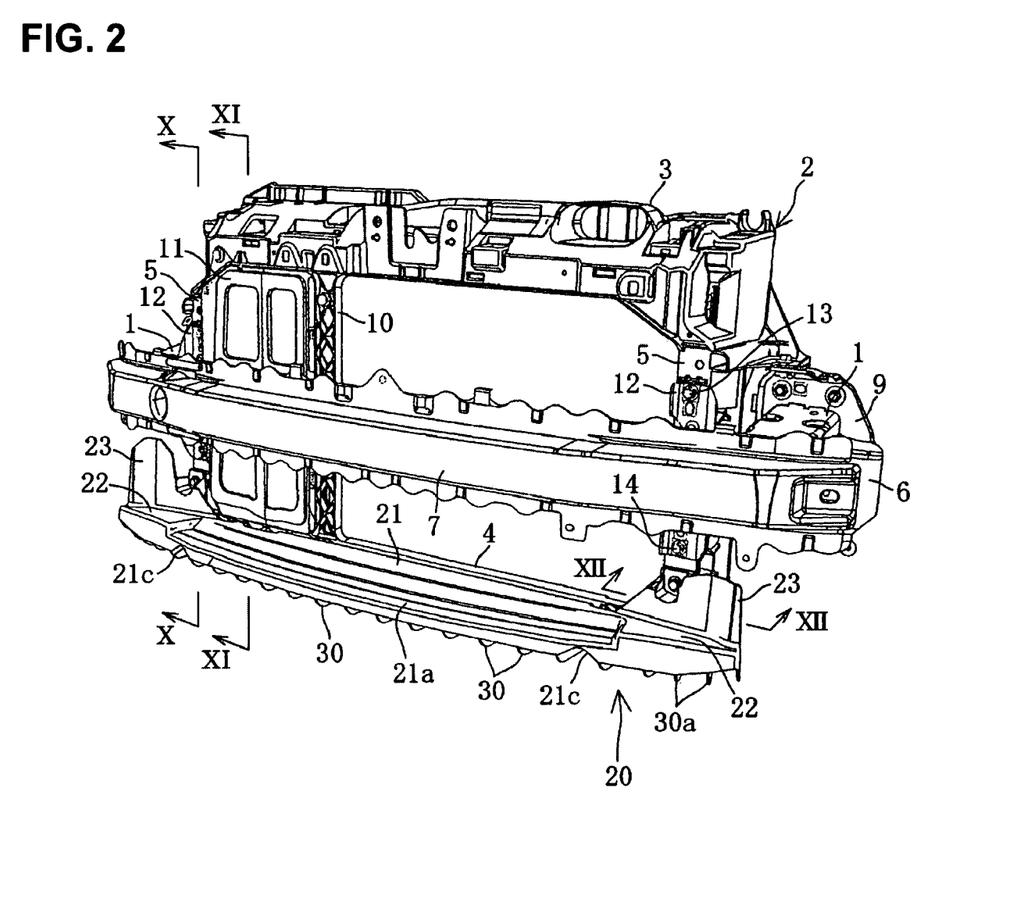
FIG. 2 is a perspective view of a major portion of the front portion of the automotive vehicle.

As shown in FIGS. 1 and 2, a front structure of an automotive vehicle comprises front side frames (not illustrated) that extend in a longitudinal direction of the vehicle at both sides, crush cans 1 that are fixed to respective front ends of the front side frames, a shroud 2 that is fixed to the front side frames and the crush cans 1, which is made from synthetic resin and formed in a rectangular shape, a bumper reinforcement 6 that is fixed to front ends of the crush cans 1 and extends in a vehicle width direction, an impact absorbing member 7 that is provided at the front of the bumper reinforcement 6, which is made from foaming synthetic resin, a plate member 20 that is made from synthetic resin, a rear end of which is attached to a shroud lower 4, which will be described below, a bumper face 8 that is provided at a front end portion of a vehicle body, which is made from synthetic resin, and so on.

The horn-shaped cylindrical crush cans 1 are fixed to respective flange members 9 at the front ends of the front side frames as shown in FIG. 2. Herein, the crush cans 1 are configured in a proper size and shape so that they are crushed by a crash impact that acts from the front via the bumper reinforcement 6 at a vehicle crash, thereby absorbing a crash impact energy properly.

The bumper reinforcement 6, which is fixed to front ends of the crush cans 1, has a closed cross section that extends in the vehicle width direction. The impact absorbing member 7, which is provided at the front of the bumper reinforcement 6, is configured in a proper size and shape so that it is deformed by the crash impact that acts from the front via the bumper face 8 at the vehicle crash, thereby absorbing the crash impact energy properly.

The shroud 2, which is disposed at a front portion in the engine room in substantially a vertical position, comprises a shroud upper 3 to support an upper portion of a heat exchanger (not illustrated), the shroud lower 4 to support a lower portion of the heat exchanger, and a pair of shroud sides 5 to interconnect both-side end portions of the shroud upper 3 and both-side end portions of the shroud lower 4. The shroud 2 is formed in a rectangular shape, when viewed from the front.

There is provided a steel shroud stay 10 at a portion that is located on slightly right side of the center of the shroud upper 3 and shroud lower 4 in the vehicle width direction. The shroud stay 10 extends substantially vertically to interconnect the shroud upper 3 and the shroud lower 4, thereby ensuring an sufficient rigidity of the shroud 2. Further, a reinforcement plate 11 is attached to the shroud upper 3 and the shroud stay 10 so as to cover a front face of a right-side end portion of the shroud 2. Also, connecting members 12 that connect the bumper reinforcement 6 to the shroud sides 5 are fixed to middle portions of the both-side shroud sides 5 via bolts 13, 14. The bumper reinforcement 6 is connected to front faces of these connecting members 12.

At the front side of the shroud lower 4 is provided a plate member 20 that extends in the vehicle width direction as shown in FIGS. 1 and 2. The plate member 20 is configured in a proper size and shape so that it can perform a specified function of prevention of the pedestrian dragging when the vehicle hits a pedestrian.

The plate member 20 comprises, as shown in FIGS. 3 to 6, a plate body portion 21, protruding portions 22 that are provided at both sides thereof, and so on. A lower face of the plate member 20 is enclosed by a surrounding wall 20*a*. A front end of the plate member 20 is formed in a curve shape in such a manner that its both sides go back, and extends to a position near a back face of the bumper face 8. A rear end of the plate member 20 contacts the front end of the shroud lower 4 in a state where the plate member 20 is attached to the shroud lower 4, so that the shroud lower 4 can receive the crash impact at the vehicle hitting the pedestrian.

The both-side protruding portions 22 are provided so as to protrude outward in the vehicle width direction from the both ends of the shroud lower 4, and at the respective protruding portions 22 are provided projecting portions 22*a* to project rearward along side end portions of the shroud 4. Inside end faces 22*b* of the projecting portions 22*a* are located, facing and having a specified distance to side end faces 4*c* of front end portions of the side end portions of the shroud 4. Herein, when the vehicle frontal oblique crash happens, the above-described inside end faces 22*b* of the projecting portions 22*a* contact the side end faces 4*c* of the shroud lower 4, so the crash impact acting on the projecting portions 22a can be received by the side end portions of the shroud lower 4.

Figure 4:
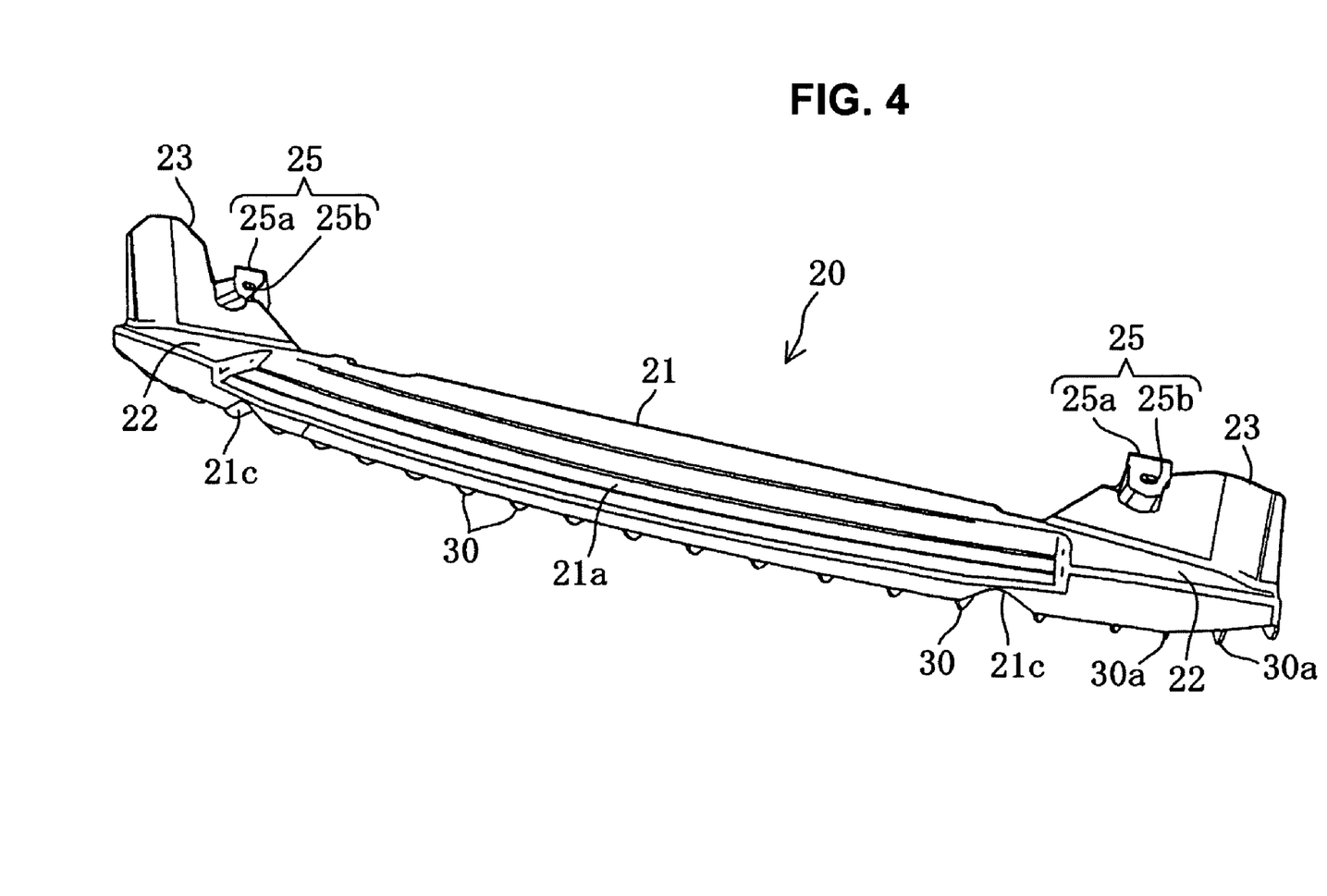
FIG. 4 is a perspective view of the plate member.
Figure 5:
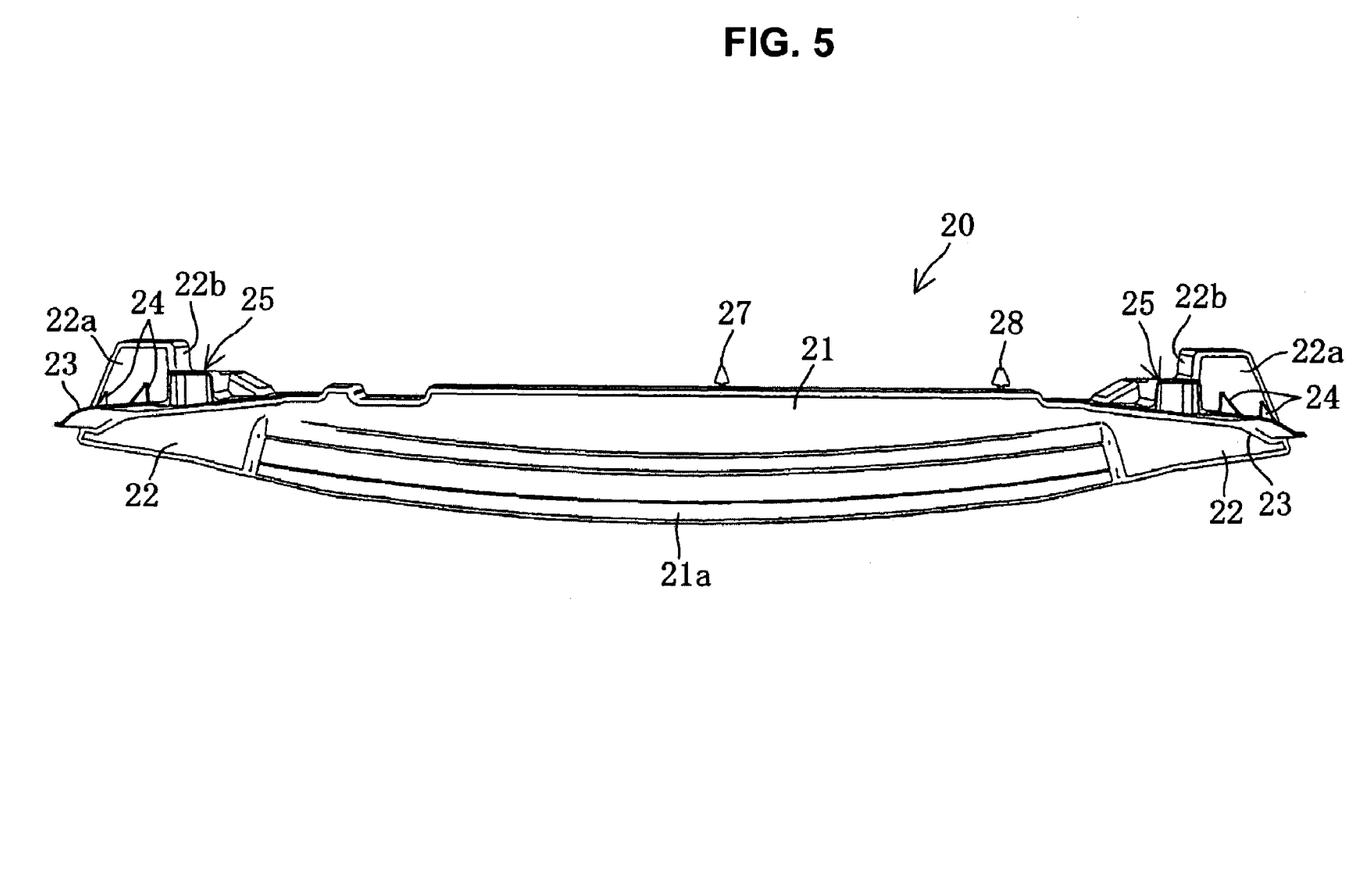
FIG. 5 is a plan view of the plate member.

Next, an upper side structure of the plate member 20 will be described. A terraced portion 21a is formed at a front half of an upper face of the plate body portion 21, as shown in FIGS. 4 and 5, so the rear end portion of the bumper face 8 does not contact the plate body portion 21. The surrounding walls 20a at the both-side ends of the terraced portion include cut-out portions 21c, respectively. At the upper face of the both-side end portions of the plate member including the protruding portions 22 are seal wall portions 23 to seal at least part of a gap between the shroud side 5 and the bumper face 8.

As shown in FIGS. 5, 7, 8, 9 and 12, the seal wall portion 23 comprises a front face wall 23a and an inside face wall 23b. The front face wall 23a is formed in a curve shape in such a manner that its outside portion goes forward further, and its tip portion is bent slightly rearward. The inside face wall 13b is formed so as to extend rearward continuously from an inside end of the front face wall 23a. Thereby, the seal wall portions 23 guide heated air from an engine or heat exchanger toward the both sides in the engine room, thereby preventing the heated air from flowing back to the front of the heat exchanger. Two ribs 24 are integrally formed between the front face wall 23a of the seal wall portion 23 and the projecting portion 22a so as to connect the rear face of the front face wall 23a and the upper face of the projecting portion 22a.

As shown in FIGS. 4, 5, 7-10, a vertical wall 25a is integrally formed with the inside end portion of the inside face wall 23b of the seal wall portion 23, and a bolt hole 25b for connecting the plate member 20 to the vertical wall 25a is formed at the vertical wall 25a. A bolt hole 29 is formed at a lower end portion of the surrounding wall 20a of the plate body portion 21 inside of the vertical wall 25a. Herein, the vertical wall 25 and the bolt hole 25b form a connecting portion 25. Hooks 27, 28 are provided at a central portion and a left portion of the rear end portion of the plate member 20. These hooks 27, 28, which are operative to attach the plate member 20 to the shroud lower 4 temporally, are provided at a lateral rib 31, which will be described below, so as to project rearward from the surrounding wall 20a.

The attachment of the plate member 20 to the shroud lower 4 is as follows, as shown in FIGS. 8 to 11. The rear end of the plate member 20 is provided so as to contact the front end of the shroud lower 4. Then, in a state where the hooks 27, 28 of the plate member 20 are engaged with the holes of the shroud lower 4, a bolt 26 is inserted from the front into the bolt hole 25b of the connecting portion 25 of the plate member 20 and a bolt hole 4a of the shroud lower 4, and a nut 26a is fastened front the back. Likewise, a bolt 27 is inserted from the front into the bolt hole 29 of the plate member 20 and a bolt hole 4b of the shroud lower 4, and a nut 27a is fastened front the back. Thereby, the plate member 20 is fixed to the shroud lower 4.

Figure 3:
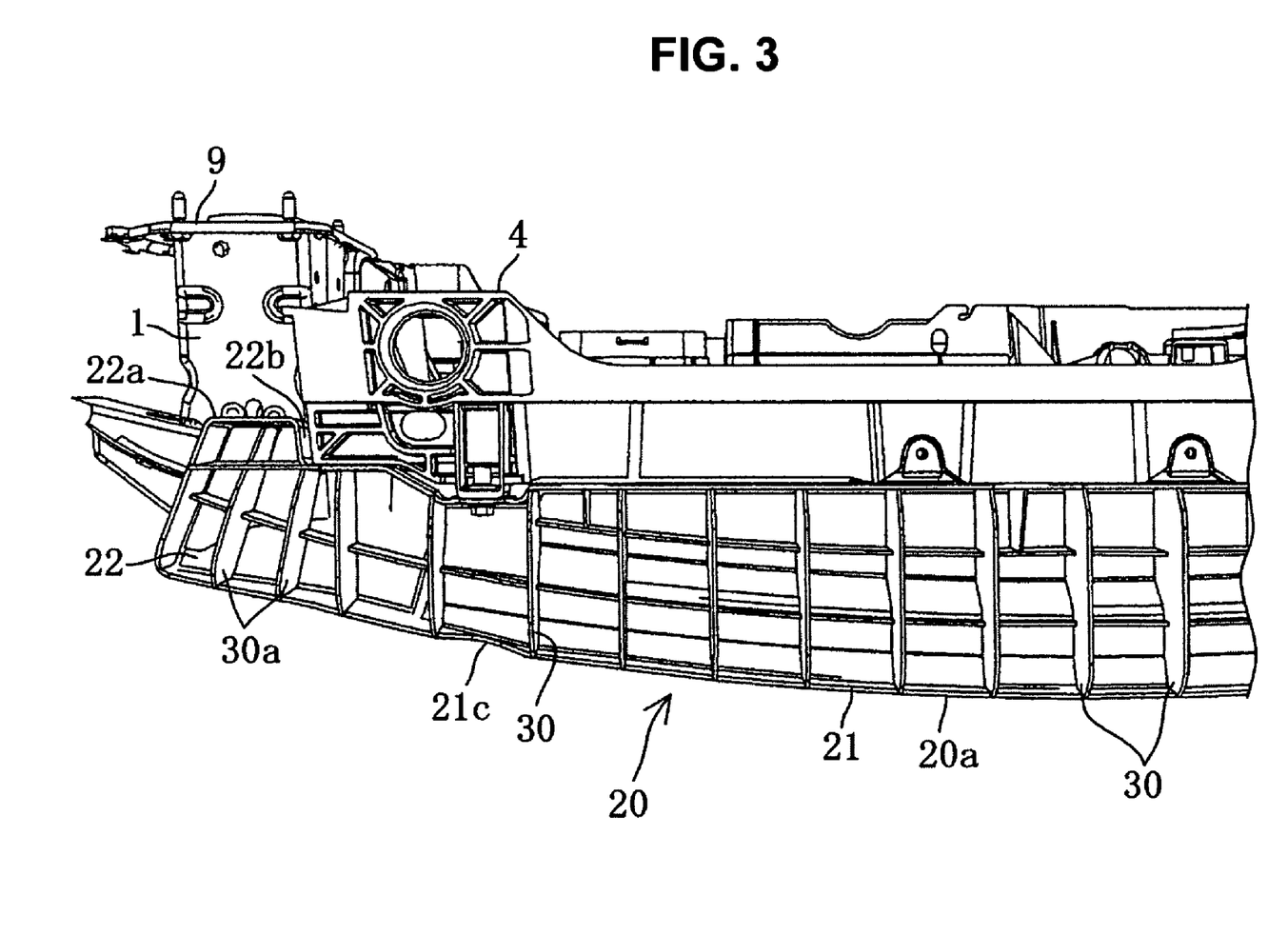
FIG. 3 is a bottom view of major portions of a shroud lower and a plate member.
Figure 6:
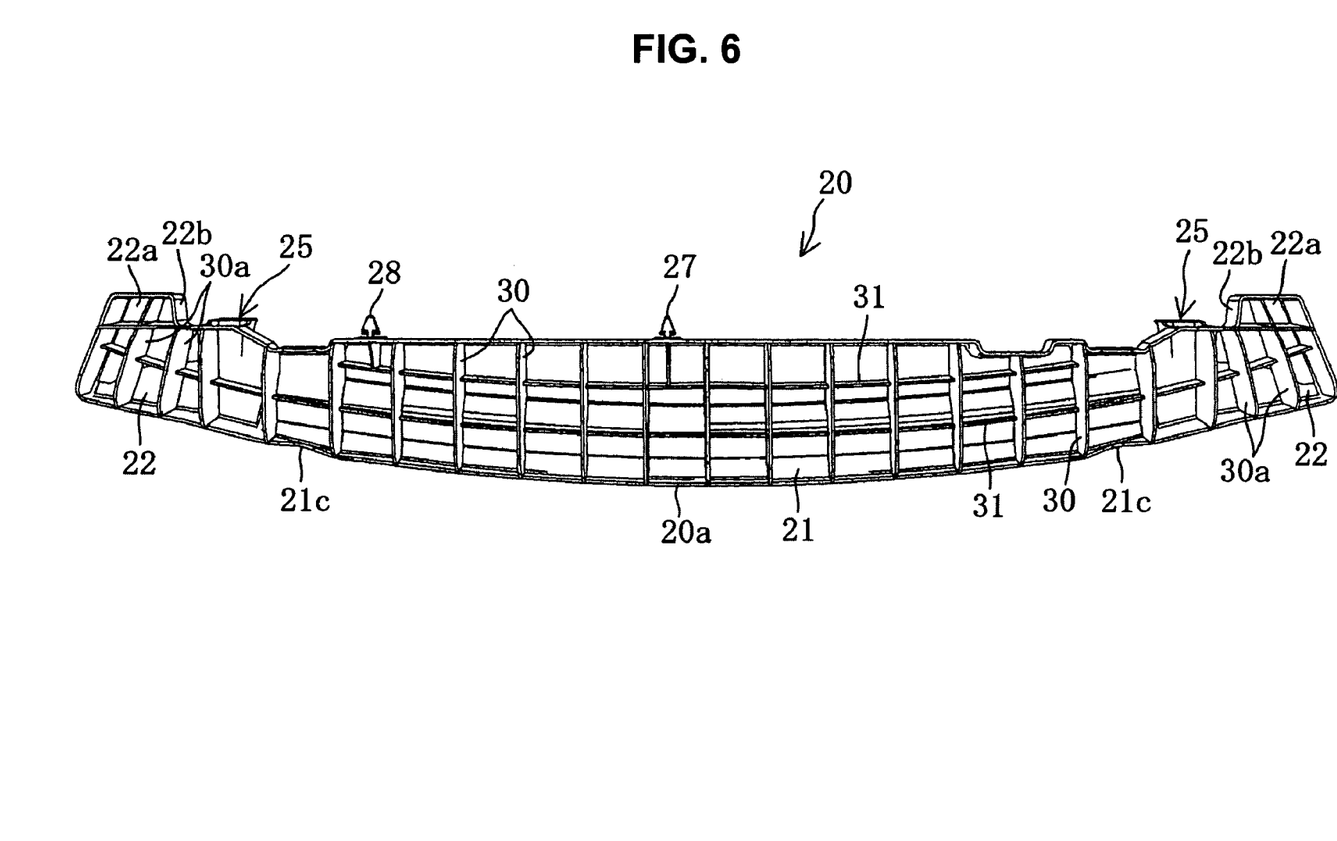
FIG. 6 is a bottom view of the plate member.
Figure 7:
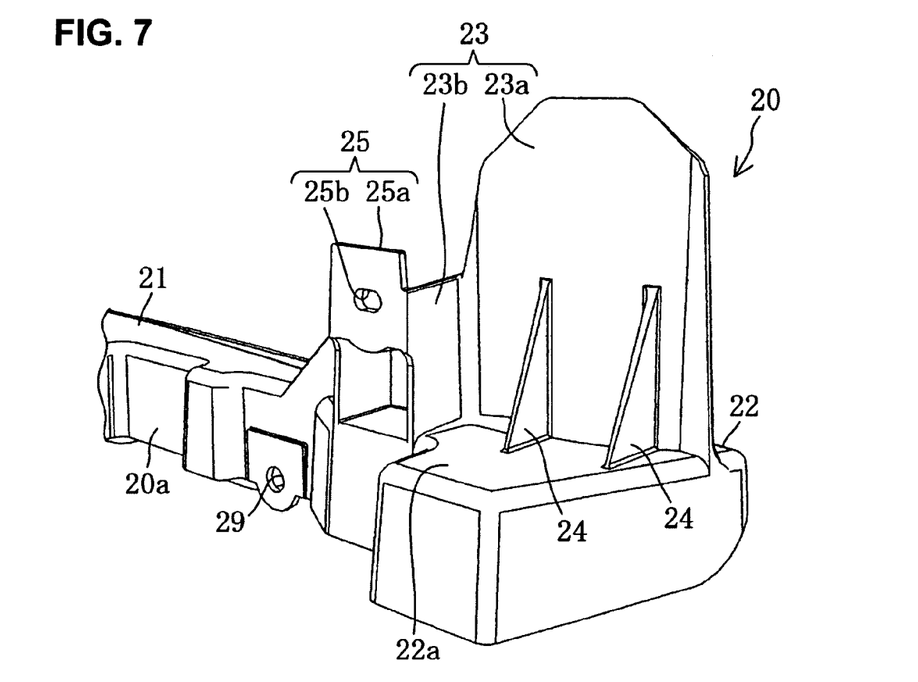
FIG. 7 is an enlarged back perspective view of a major portion of the plate member.
Figure 8:
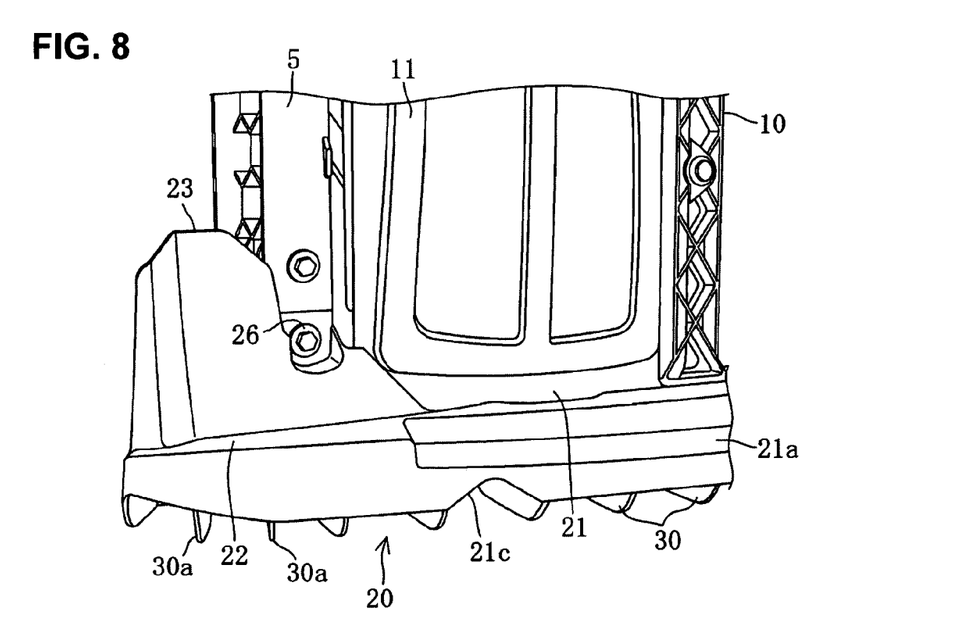
FIG. 8 is an enlarged perspective view of a major portion of a connecting portion between the shroud lower and the plate member.
Figure 9:
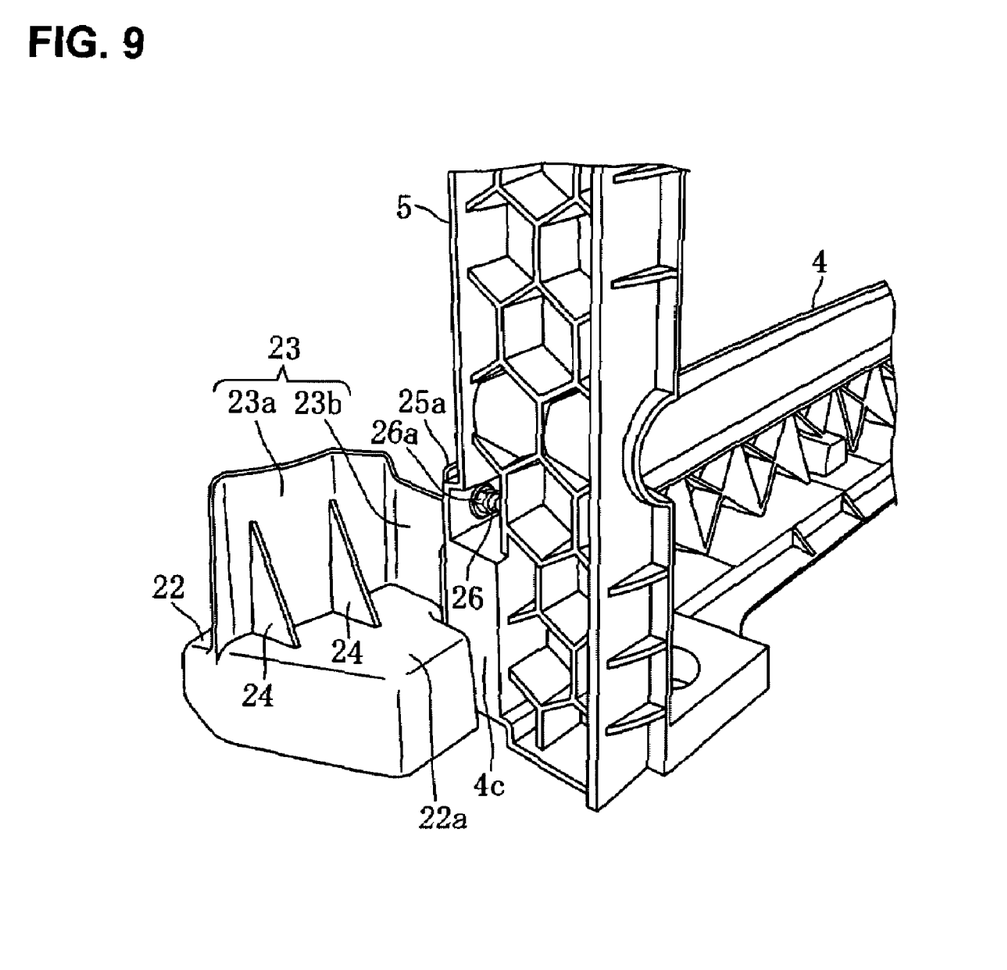
FIG. 9 is an enlarged back perspective view of the major portion of the connecting portion between the shroud lower and the plate member.
Figure 10:
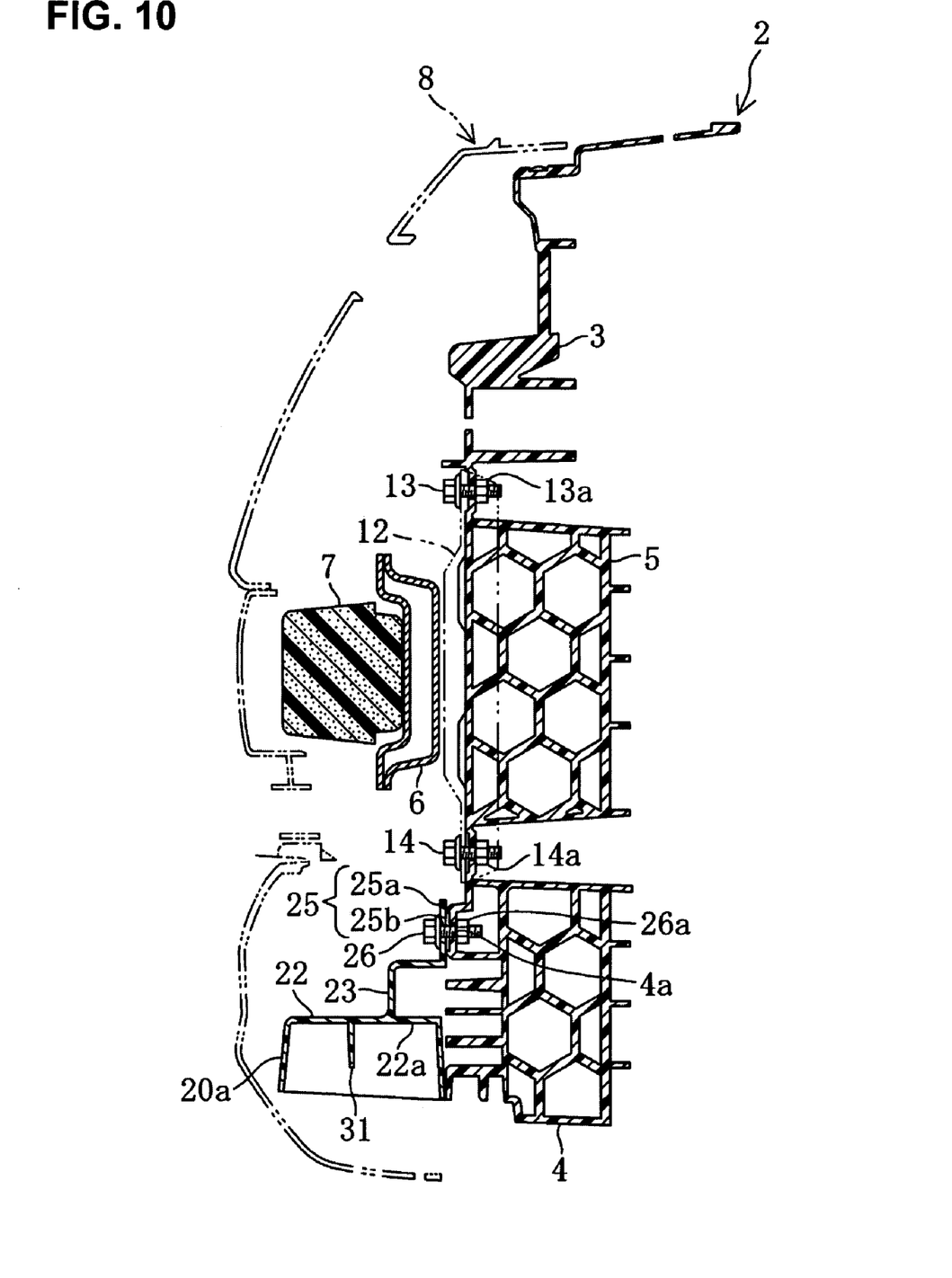
FIG. 10 is a sectional view taken along line X-X of FIG. 2.
Figure 11:
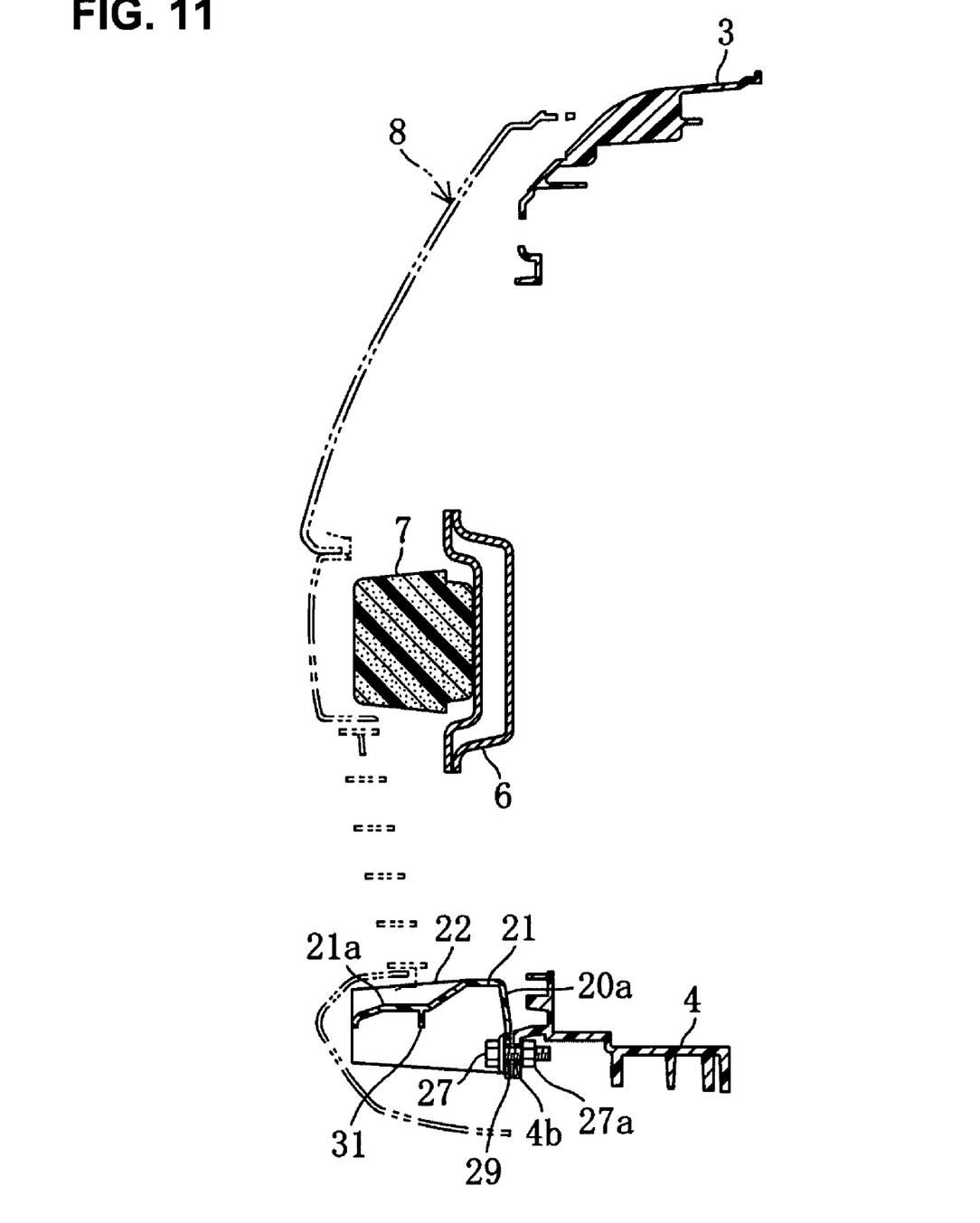
FIG. 11 is a sectional view taken along line XI-XI of FIG. 2.
Figure 12:
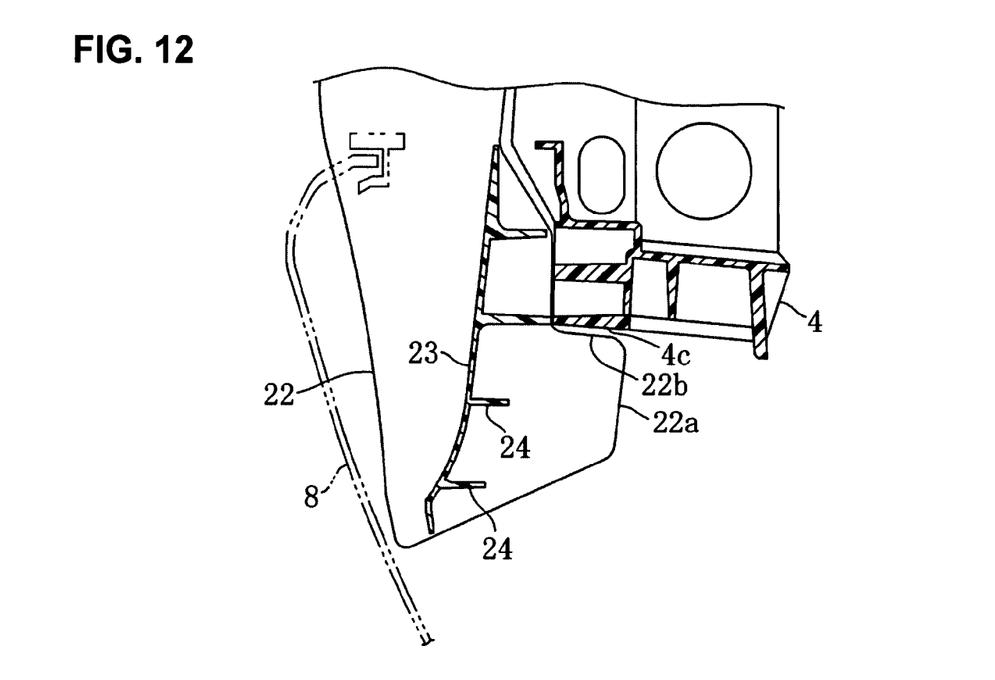
FIG. 12 is a sectional view taken along line XII-XII of FIG. 2.

Next, a lower structure of the plate member 20 will be described. As shown in FIGS. 3 and 6, at lower faces of the plate member 2 and the protruding portions 22 are provided a plurality of vertical ribs 30, 30a extending in the longitudinal direction and a plurality of lateral ribs 31 extending in the vehicle width direction.

The vertical dimension of the vertical rib 30 is greater than that of the lateral rib 31, and lower end portions of the vertical ribs 30, 30a extend below the surrounding wall 20a. Two vertical ribs 30a that are provided at the lower face of each of the protruding portions 22 are formed so as to extend obliquely with respect to the longitudinal direction of the vehicle in such a manner that rear portions thereof are directed inwardly in the vehicle width direction. Thereby, the vertical ribs 30a receive the load of the crash impact acting on the protruding portions 22 at the vehicle frontal oblique crash, so the protruding portions 22 can have a strong rigidity enough to endure the crash impact.

The bumper face 8 is provided in front of the bumper reinforcement 6 and the impact absorbing member 7 and formed in a curve shape in such a manner that its both sides go back. The front portion of the plate member 20 faces the bumper face 8 substantially in parallel.

Next, functions and effects of the above-described front structure of an automotive vehicle will be described.

There are provided the shroud lower 4, bumper face 8 and plate member 20, and the protruding portions 22 are provided at the both-side ends of the plate member 20 so as to protrude outward respectively in the vehicle width direction from the both-side ends of the shroud lower 4, and the projecting portions 22a are provided at the protruding portions 22 so as to project rearward respectively along the side end portions of the shroud lower 4. Accordingly, when the vehicle hits the pedestrian obliquely from the front, the crash impact may act on the protruding portions 22 of the plate member 20. Herein, however, the inside end faces 22b of the projecting portions 22 contact the side end faces 4c of the shroud lower 4, so the protruding portions 22a are supported by the side-end portions of the shroud lower 4. Accordingly, the crash impact acting on the projecting portions 22a of the plate member 20 can be properly received by the side end portions of the shroud lower 4.

As described above, since there are provided the protruding portions 22 at the both-side ends of the plate member 20 so as to protrude outward respectively in the vehicle width direction from the both-side ends of the shroud lower 4 and the projecting portions 22a at the protruding portions 22 so as to project rearward respectively along the side end portions of the shroud lower 4, the protruding portions 22 of the plate member 20 are supported by the side-end portions of the shroud lower 4 and thereby can have the strong rigidity against the crash impact. Thus, the crash impact acting on the projecting portions 22a of the plate member 20 can be received by the side end portions of the shroud lower 4, so the prevention of the pedestrian dragging against the vehicle frontal oblique crush can be improved and thereby the safety of the pedestrian can be enhanced.

Also, since at the both-side ends of the plate member 20 including the protruding portions 22 are provided the seal wall portions 23 to seal at least part of the gap between the shroud side 5 and the bumper face 8, it can be prevented properly that the heated air from the engine or heat exchanger flows back to the front of the heat exchanger via the gap between the shroud side 5 and the bumper face 8. Further, since the plurality of ribs 24 are provided between the seal wall portions 23 and the projecting portions 22a so as to connect the both portions respectively, the rigidity of the projection portions 22a of the plate member 20 can be properly increased. And, since the above-described prevention of the heated-air back and rigidity increase can be attained without any improper increase of the number of parts, manufacturing costs can be also reduced.

Also, since there is provided the connecting portion 25 to connect the plate member 20 to the front face of the shroud side 5 and the connecting portion 25 is formed integrally with the inside end portion of the inside face wall 23b of the seal wall portion 23, the support force of the shroud side 5 for the plate member 20 can be properly increased by using the structure of the seal wall portions 23. Further, since the bolt hole 29 is formed at the lower end portion of the surrounding wall 20a of the plate body portion 21 inside of the vertical wall 25a, the plate member 20 can be fixed to the shroud lower 4 firmly with a different connection position from the connecting portion 25.

Further, since at the lower face of the plate member 20 are provided the plurality of vertical ribs 30, 30a extending in the longitudinal direction and the plural vertical ribs 30a provided at the lower face of the protruding portion 22 are formed so as to extend obliquely with respect to the longitudinal direction of the vehicle in such a manner that rear portions thereof are directed inwardly in the vehicle width direction, the vertical ribs 30a can receive the load of the crash impact acting on the protruding portions 22 at the vehicle frontal oblique crash and the rigidity of the protruding portions 22 of the plate member 20 can be increased. Accordingly, it can be prevented that the protruding portions 22 of the plate member 20 deform toward the back of the shroud sides 5.

Embodiment 2

A second embodiment of the present invention will be described referring to FIGS. 13-17. Herein, only structures that are different form the previous embodiment will be described. The second embodiment is an example in which a plate member 50 is provided at a front portion of a different type of automotive vehicle.

Figure 13:
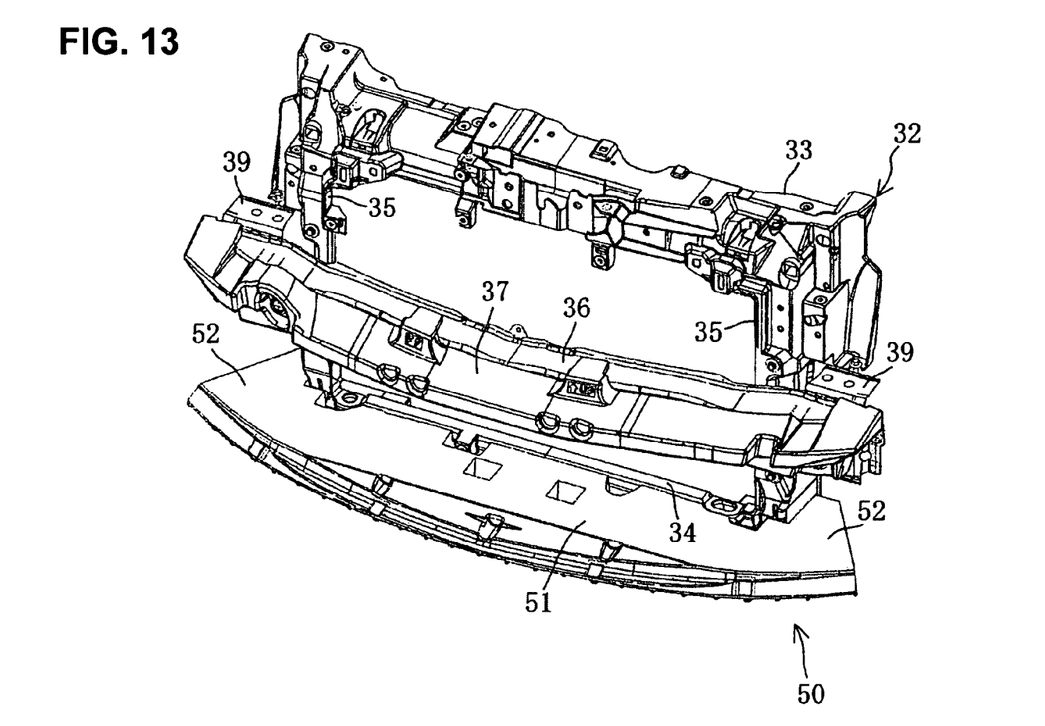
FIG. 13 is a view of a second embodiment, which corresponds to FIG. 2.
Figure 14:
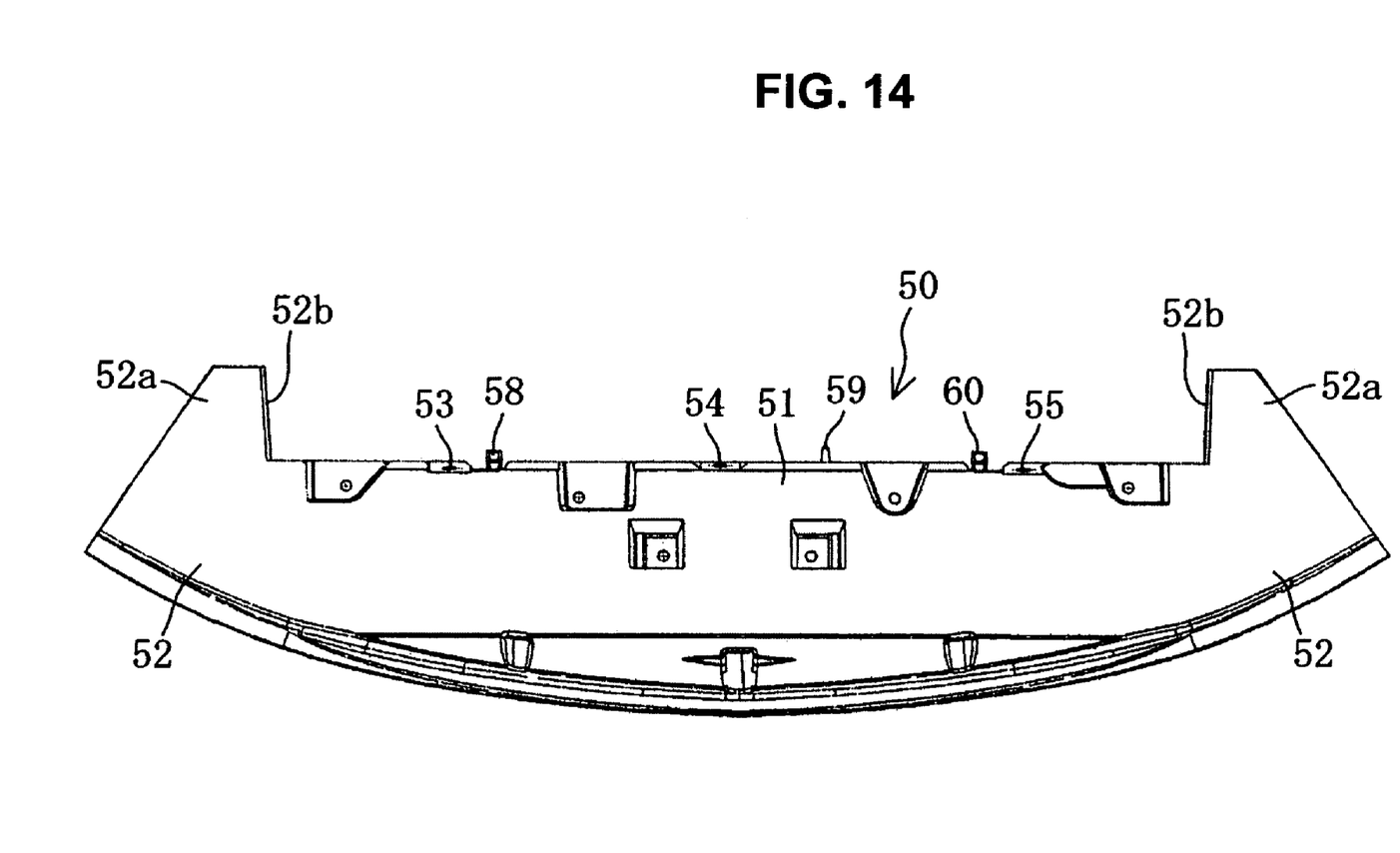
FIG. 14 is a view of the second embodiment, which corresponds to FIG. 5.

As shown in FIG. 13, a front structure of the automotive vehicle comprises front side frames (not illustrated) that extend in the longitudinal direction of the vehicle at both sides, attaching brackets 39 that are fixed to respective front ends of the front side frames, a shroud 32 that is fixed to the front side frames and the attaching brakes 32, which is made from synthetic resin and formed in a rectangular shape, a bumper reinforcement 36 that is fixed to front ends of the attaching brackets 39 and extends in the vehicle width direction, an impact absorbing member 37 that is provided at the front of the bumper reinforcement 36, which is made from foaming synthetic resin, the plate member 50 that is made from synthetic resin, a rear end of which is attached to a shroud lower 34, a bumper face 38 that is provided at a front end portion of a vehicle body (see FIG. 17), which is made from synthetic resin, and so on.

The plate member 50 is formed, as shown in FIGS. 14-17, in substantially an arc shape, when viewed from the above, and comprises a plate body portion 51, protruding portions 52 provided at both sides thereof, and so on. A front end of the plate member 50 is formed in a curve shape in such a manner that its both sides go back, and extends to a position near a back face of the bumper face 58. Herein, the plate member 50 does not have the seal wall portion of the first embodiment.

A front end portion of the plate body portion 51 has a forward slant shape, and a front end of the plate body portion 51 has a downward curve shape so that a rear end portion of the bumper face 38 does not contact the plate body portion 51. A rear-side surrounding wall 50a of the plate body portion 51 has a rearward slant shape.

The both-side protruding portions 52 are provided so as to protrude outward in the vehicle width direction from the both ends of the shroud lower 34. At the respective protruding portions 52 are provided projecting portions 52a to project rearward along side end portions of the shroud 34. Inside end faces 52b of the projecting portions 52a are located facing and having a specified distance to side end faces 34b of front end portions of the side end portions of the shroud 34. Herein, when the vehicle frontal oblique crash happens, the above-described inside end faces 52b of the projecting portions 52a contact the side end faces 34b of the shroud lower 34, so the crash impact acting on the projecting portions 52a can be received by the side end portions of the shroud lower 34.

As shown in FIGS. 14-17, both-side end portions and a center portion of the surrounding wall 50a of the plate body portion 51 have bolt holes 43, 55 and 54 for connecting the plate member 50 to the shroud lower 34, respectively. The plate member 50 is attached to the shroud lower 34 via bolts 56, 57 and nuts 56a, 57a. A connection of the right-side end portion of the plate body member 51 is conducted in such a manner that the bolt 56 is inserted from the front into the bolt hole 53 of the plate member 50 and the bolt hole 34a of the shroud lower 34 and then the nut 56a is fastened from the back. A connection of the left-side end portion and the center portion of the plate body portion 51 is conduced in the same way. Thereby, the plate member 50 is connected to the shroud lower 34. Hooks 58, 60 and 59, which are operative to attach the plate member 50 to the shroud lower 34 temporally, are respectively provided at the left-and-right side portions and the center portion of a rear wall 51a of the plate body portion 51.

Figure 15:
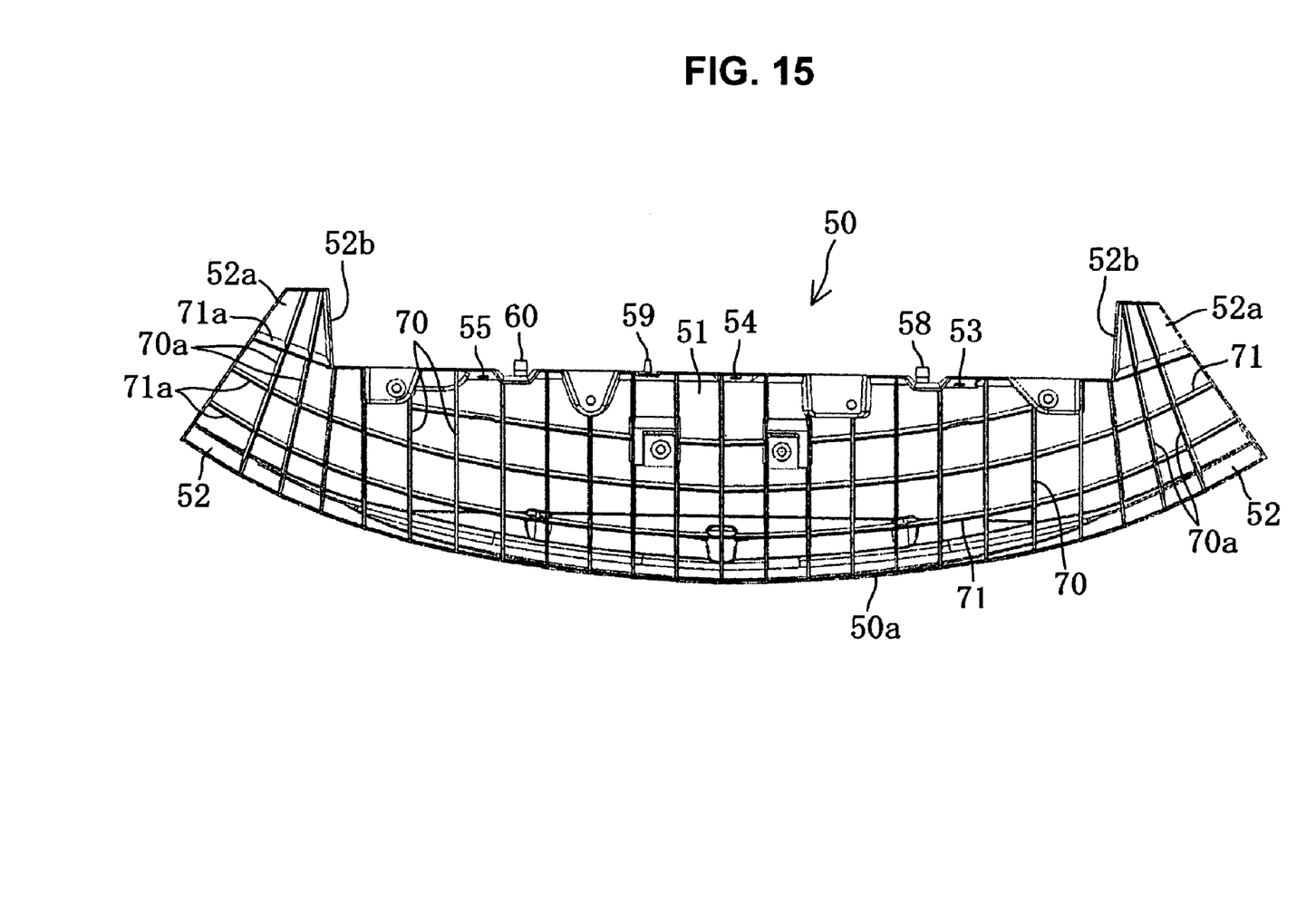
FIG. 15 is a view of the second embodiment, which corresponds to FIG. 6.
Figure 16:
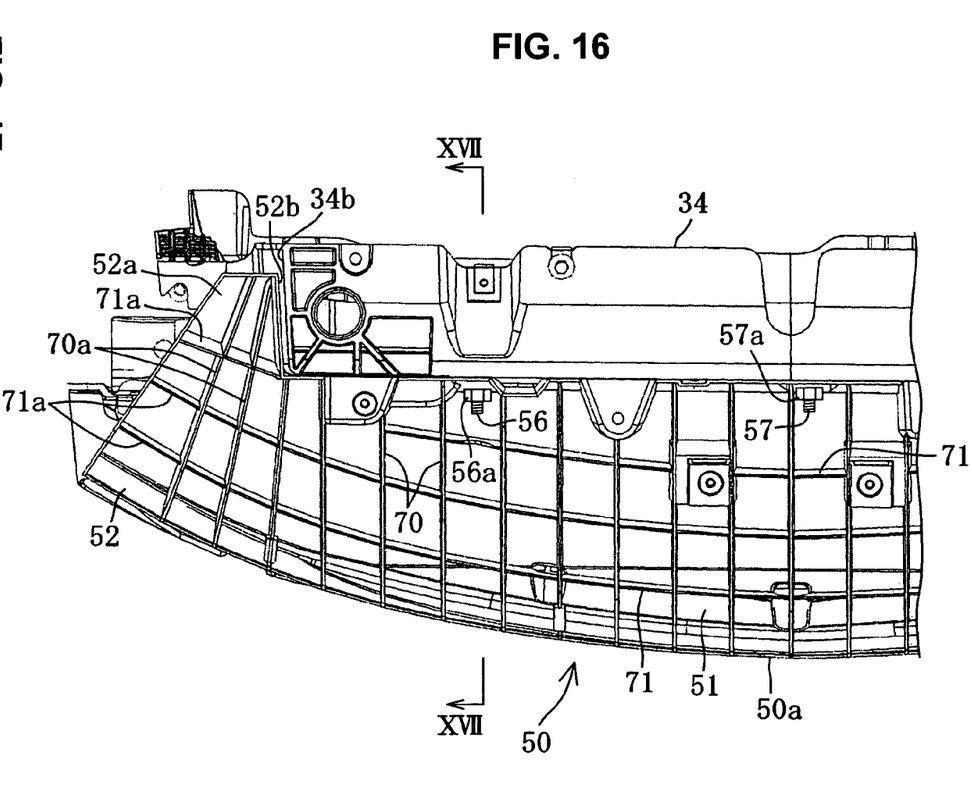
FIG. 16 is a view of the second embodiment, which corresponds to FIG. 3.
Figure 17:
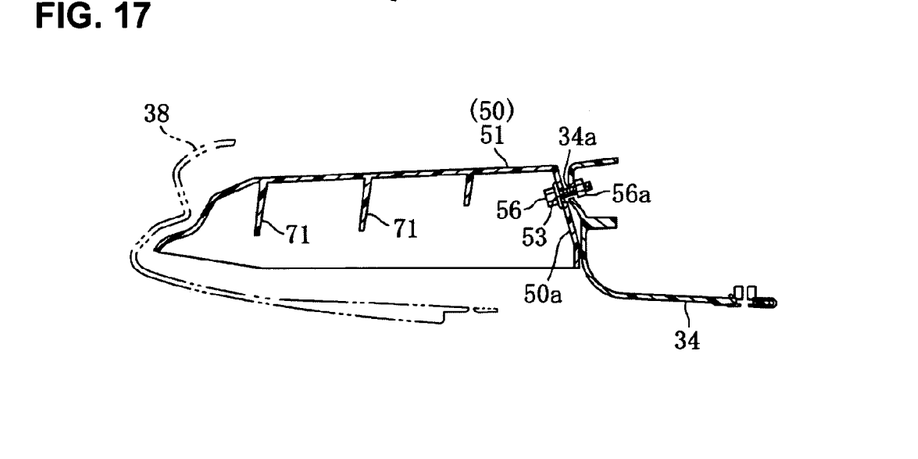
FIG. 17 is a sectional view taken along line XVII-XVII of FIG. 16.

As shown in FIGS. 15 and 16, at lower faces of the plate body portion 51 and the protruding portions 52 are provided a plurality of vertical ribs 70, 70a extending in the longitudinal direction. A plurality of lateral ribs 71 extending in the vehicle width direction are provided at the lower faces of the plate body portion 51 and the protruding portions 52. In particular, at the portion of the lower face of the protruding portion 52 are provided three lateral ribs 71a and the two vertical ribs 70a that are disposed substantially perpendicularly. Thereby, the crash impact load acting on the vertical ribs 70a of the lower face of the protruding portion 52 of the plate member 50 at the vehicle frontal oblique crush can be received effectively by the lateral ribs 71a, thereby preventing the protruding portion 52 of the plate member 50 from being deformed.

The present invention should not be limited to the above-described embodiments. Any other modifications and improvements may be applied within the scope of a sprit of the present invention. The following modifications can be applied, for example.

1) The number of the ribs 24 that are provided at the seal wall portion 23 in the above-described first embodiment may be three or more, instead of two.

2) In the above-described second embodiment, a seal wall portion having plural ribs may be provided at the both-side portions of the plate member 50 including the protruding portions 52, like the first embodiment.

3) The number of the vertical ribs 30a, 70a that are provided at the protruding portions 22, 52 of the plate members 20, 50 may be three or more, instead of two.

What is claimed is:

1. A front structure of an automotive vehicle, comprising:
a shroud lower provided at a front portion in an engine room, the shroud lower supporting a heat exchanger;
a bumper face provided at a front end portion of a vehicle body; and
a plate member, a front end of which extends to a position near a back face of the bumper face and a rear end of which is attached to the shroud lower,
wherein protruding portions are provided at both-side ends of the plate member so as to protrude outward respectively in a vehicle width direction from both-side ends of the shroud lower, projecting portions are provided at the protruding portions so as to project rearward respectively along side end portions of the shroud lower, and inside end faces of the projecting portions are located so as to face side end faces of front end portions of the side end portions of the shroud with a specified distance therebetween so that a crash impact acting on the projecting portions is configured to be received by the side end portions of the shroud lower.

2. The front structure of an automotive vehicle of claim 1, further comprising:

a shroud upper to support an upper portion of the heat exchanger; and a pair of shroud sides to interconnect both-side end portions of the shroud upper and both-side end portions of the shroud lower, wherein at the both-side ends of the plate member including the protruding portions are provided seal wall portions to seal at least part of a gap between the shroud side and the bumper face, and a plurality of ribs are provided between the seal wall portions and the projecting portions so as to connect the both portions respectively.

3. The front structure of an automotive vehicle of claim 2, wherein there is provided a connecting portion to connect the plate member to a front face of the shroud side, and the connecting portion is formed integrally with an inside end portion of the seal wall portion.

4. The front structure of an automotive vehicle of claim 1, wherein a plurality of vertical ribs to extend substantially in a longitudinal direction of the vehicle are provided at plural portions of a lower face of the plate member in the vehicle width direction, and plural vertical ribs that are provided at a lower face of the protruding portion are formed so as to extend obliquely with respect to the longitudinal direction of the vehicle in such a manner that rear portions thereof are directed inwardly in the vehicle width direction.

5. The front structure of an automotive vehicle of claim 4, wherein a plurality of lateral ribs to extend substantially in the vehicle width direction are provided at the lower face of the plate member, and the plural lateral ribs are formed so as to be substantially perpendicular to the vertical ribs provided at the lower face of the protruding portion.

* * * * *